(12) United States Patent
Hattori et al.

(10) Patent No.: US 6,793,611 B2
(45) Date of Patent: Sep. 21, 2004

(54) PAPER FEEDING ROLLER

(75) Inventors: Takayuki Hattori, Hyogo (JP); Tetsuo Mizoguchi, Hyogo (JP); Hideyuki Okuyama, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/305,053

(22) Filed: Nov. 27, 2002

(65) Prior Publication Data

US 2003/0118813 A1 Jun. 26, 2003

(30) Foreign Application Priority Data

Nov. 30, 2001 (JP) ........................................ 2001-366442

(51) Int. Cl.[7] .............................................. B23P 15/00
(52) U.S. Cl. .......................... 492/56; 492/59; 428/492
(58) Field of Search ..................... 492/56, 59; 271/109, 271/169, 314; 428/492, 323, 340, 375

(56) References Cited

U.S. PATENT DOCUMENTS

| | | | | |
|---|---|---|---|---|
| 5,625,858 A | * | 4/1997 | Hirai et al. .................. | 399/176 |
| 5,733,235 A | * | 3/1998 | Waku et al. .................. | 492/25 |
| 5,810,705 A | * | 9/1998 | Mimura et al. ............... | 492/56 |
| 5,849,399 A | * | 12/1998 | Law et al. ................... | 428/212 |
| 6,001,454 A | * | 12/1999 | Murata et al. ............... | 428/141 |
| 6,127,031 A | | 10/2000 | Fukumoto | |
| 6,146,320 A | * | 11/2000 | Yoshikawa et al. ........... | 492/56 |
| 6,184,295 B1 | * | 2/2001 | Okuyama .................... | 525/192 |
| 6,224,526 B1 | * | 5/2001 | Stimmelmayr et al. ........ | 492/56 |
| 6,337,364 B1 | * | 1/2002 | Sakaki et al. ................ | 524/270 |
| 6,476,140 B2 | * | 11/2002 | Hattori et al. ............... | 525/191 |
| 6,481,707 B2 | * | 11/2002 | Matsuo et al. ............... | 271/109 |
| 6,602,957 B2 | * | 8/2003 | Hattori et al. ............... | 525/191 |
| 2002/0119324 A1 | * | 8/2002 | Harashima et al. ....... | 428/423.3 |

FOREIGN PATENT DOCUMENTS

| | | |
|---|---|---|
| EP | 0 539 003 A | 4/1993 |
| EP | 0733676 A1 | 9/1996 |
| EP | 0 872 441 A | 10/1998 |
| EP | 0924258 A2 | 6/1999 |
| EP | 0974618 A1 | 1/2000 |
| JP | 2-70636 A | 3/1990 |
| JP | 02070636 | 3/1990 |
| JP | 11-236465 A | 8/1999 |
| JP | 11348149 | 12/1999 |
| JP | 2001-38971 A | 2/2001 |
| JP | 2001-038971 | 2/2001 |
| JP | 2001-055491 | 2/2001 |

* cited by examiner

*Primary Examiner*—Irene Cuda Rosenbaum
(74) *Attorney, Agent, or Firm*—Birch, Stewart, Kolasch & Birch, LLP

(57) ABSTRACT

A paper-feeding roller (1) formed by cylindrically molding a thermoplastic elastomer composition containing a thermoplastic resin or a thermoplastic elastomer in which a rubber or a thermoplastic elastomer that can be crosslinked is dispersed by dynamic crosslinking. A surface layer of the paper-feeding roller (1) contains titanium oxide at not less than 1.5% nor more than 50% in a volume fraction.

11 Claims, 3 Drawing Sheets

PAPER FEEDING ROLLER

BACKGROUND OF THE INVENTION

1. Field of the Invention

The present invention relates to a paper-feeding roller and a method of manufacturing the paper-feeding roller. More particularly, the present invention relates to a paper-feeding roller having a high degree of flexibility and moldability and having improved performance of feeding objects such as paper for plain paper copy (PPC) and capable of effectively preventing non-feeding of silica paper.

2. Description of the Related Art

The rubber roller is used in a paper-feeding mechanism of an ink jet printer, a laser printer, an electrostatic copying apparatus, a facsimile apparatus, an automatic teller machine machine (ATM), and the like. The rubber roller is required to feed objects such as a sheet of paper or a film by picking up the objects one by one separately from the objects piled up one upon another. Therefore, the rubber roller is demanded to have a high degree of flexibility and wear resistance.

The paper-feeding roller of this kind is desired to feed various kinds of printing media such as paper for PPC, silica paper, Chinese paper, an OHP film, and photo-printing paper by picking them up one by one separately without non-feeding thereof.

As disclosed in Japanese Patent Application Laid-Open No. 11-236465, the present applicant proposed the paper-feeding roller composed of the thermoplastic elastomer composition formed by mixing the rubber component, the hydrogenated styrene thermoplastic elastomer, and the olefin resin with one another; dynamically crosslinking the rubber component with the resinous crosslinking agent; and dispersing the rubber component in the hydrogenated styrene thermoplastic elastomer and the olefin resin. In the thermoplastic elastomer composition, the mixing ratio of the hydrogenated styrene thermoplastic elastomer as well as the olefin resin to the rubber is set to a certain range. Thereby the paper-feeding roller composed of the thermoplastic elastomer composition is favorable in its wear resistance, friction coefficient, compression set, and capable of preventing occurrence of blooming. Thus the paper-feeding roller is superior in its feeding performance.

The paper-feeding roller disclosed in Japanese Patent Application Laid-Open No. 2-70636 has the rubber layer containing 100–300 parts by weight of the softener and 10–300 parts by weight of titanium oxide for 100 parts by weight of EPDM (ethylene-propylene-diene rubber) in the surface thereof. The paper-feeding roller is intended to prevent ultraviolet rays from deteriorating its friction coefficient by the use of the EPDM rubber and the titanium oxide.

The paper-feeding roller disclosed in Japanese Patent Application Laid-Open No.2001-38971 is composed of silicone rubber containing the inorganic fibrous reinforcing material and the inorganic particulate filler. Titanium oxide is exemplified as the inorganic particulate filler. The proposal is intended to provide the paper-feeding roller superior in unadhesiveness to tack paper which has adhesiveness on the back side of thermal recording paper.

However, the paper-feeding roller proposed by the present applicant and disclosed in Japanese Patent Application Laid-Open No. 11-236465 has a possibility of non-feeding of paper containing much silica, in the case where it feeds a large number of the paper containing much silica, although the paper-feeding roller has a high friction coefficient for plain paper. Thus the paper-feeding roller has room for improvement in the feeding force for the silica paper or the like.

The vulcanized EPDM rubber roller and the vulcanized chlorinated polyethylene rubber roller hitherto used are liable to give rise to non-feeding for silica paper. Further these substances have a low moldability.

Since the paper-feeding roller disclosed in Japanese Patent Application Laid-Open No. 2-70636 contains the EPDM rubber only, the paper-feeding roller has a low force for feeding paper Immediately after the paper is started to be supplied to the roller and has problems that the material has a low moldability and the manufacturing cost is high.

Since the paper-feeding roller disclosed in Japanese Patent Application Laid-Open No.2001-38971 is composed of the silicone rubber, the paper-feeding roller has a low force for feeding paper immediately after the paper is started to be supplied to the roller. Further the cost of the material for the paper-feeding roller is high and has a low moldability.

SUMMARY OF THE INVENTION

The present invention has been made in view of the above-described problems. Therefore it is an object of the present invention to provide a paper-feeding roller having rubber-like durability, elasticity, flexibility, resin-like moldability, and a high wear resistance and a sufficient force for feeding silica paper.

To solve the above-described problem, the present invention provides a paper-feeding roller formed by cylindrically molding a thermoplastic elastomer composition containing a thermoplastic resin or a thermoplastic elastomer in which a rubber or a thermoplastic elastomer which can be crosslinked is dispersed by dynamic crosslinking. A surface layer of the paper-feeding roller contains titanium oxide at not less than 1.5% nor more than 50% in a volume fraction.

The thermoplastic elastomer composition of the paper-feeding roller of the present invention contains the thermoplastic resin or the thermoplastic elastomer in which the rubber or the thermoplastic elastomer which can be crosslinked is dispersed by dynamic crosslinking. Therefore the paper-feeding roller has a rubber-like durability, elasticity, flexibility, resin-like moldability, and a high wear resistance. The paper-feeding roller contains the titanium oxide at not less than 1.5% nor more than 50% in a volume fraction in its surface layer which contacts objects such as paper. Therefore the paper-feeding roller reduces the degree of non-feeding of silica paper which is a problem to be solved and has a preferable feeding force before and after paper is supplied thereto.

The amount of the titanium oxide to be contained in the surface layer of the paper-feeding roller in a volume fraction is not less than 1.5% nor more than 50%, favorably not less than 3.0% nor more than 45%, and more favorably not less than 6.0% nor more than 40%.

If the amount of the titanium oxide is contained in the surface layer of the roller in the volume fraction at less than 1.5%, it is impossible to obtain sufficient feeding force for silica paper. If the amount of the titanium oxide is contained in the surface layer of the roller in the volume fraction at more than 50%, the roller has a high hardness. Consequently the roller has a low friction coefficient or a low mechanical strength. Thus there is a possibility that the roller cannot be put into practical use.

The surface layer means the range of the thickness of the roller less than 5% and preferably less than 3% of the entire thickness thereof from the upper surface thereof. The surface layer may appear when the wear of the roller advances during the use thereof. In the case of a dynamically crosslinked material, a skin rich in resin and not crosslinked thermoplastic elastomer is formed on the surface layer of the roller. Thus it is necessary that the amount of the titanium oxide contained in the resinous phase (matrix phase) falls in the above-described range.

It is preferable that the thermoplastic elastomer composition is formed by dispersing a compound (B) containing a rubber component whose main component is EPDM by dynamic crosslinking in a compound (A) containing a styrene thermoplastic elastomer as a main component thereof. Thereby it is possible to increase an initial friction coefficient of the roller for plain paper and also increase the feeding force thereof for initial and subsequent feeding of silica paper. Thus the roller is capable of displaying high and stable feeding force for various kinds of paper.

The compound (A) contains not less than 15 nor more than 500 parts by weight of a softener and favorably not less than 25 nor more than 400 parts by weight of the softener for 100 parts by weight of the rubber component. Thereby the roller is allowed to have an appropriate degree of flexibility and elasticity.

If the compound (A) contains less than 15 parts by weight of the softener for 100 parts by weight of the rubber component, the roller has a high hardness and thus it is difficult to provide the roller with a sufficient feeding force. On the other hand, if the compound (A) contains more than 500 parts by weight of the softener for 100 parts by weight of the rubber component, the softener may bleed from the surface of the dynamically crosslinked substance or the softener may inhibit crosslinking. Thus the rubber component is not crosslinked sufficiently, and the property of the dynamically crosslinked substance is liable to deteriorate.

The compound (A) contains not less than 1 nor more than 50 parts by weight of a resin whose main component is an olefin resin, favorably not less than 2 nor more than 40 parts by weight of the resin, and more favorably not less than 4 nor more than 35 parts by weight of the resin for 100 parts by weight of the rubber component. Thereby the wear resistance of the roller can be improved.

If the compound (A) contains less than 1 part by weight of the resin, it is difficult for the roller to obtain a sufficient degree of wear resistance. If the compound (A) contains more than 50 parts by weight of the resin, the roller has a high hardness and thus it is difficult to provide the roller with a sufficient feeding force.

The compound (B) contains not less than 15 nor more than 600 parts by weight of a softener and favorably not less than 25 nor more than 400 parts by weight of the softener for 100 parts by weight of the rubber component. Thereby the roller is allowed to have a proper degree of flexibility and elasticity.

If the compound (B) contains less than 15 parts by weight of the softener for 100 parts by weight of the rubber component, the roller has a high hardness and thus it is difficult to provide the roller with a sufficient degree of feeding force. On the other hand, if the compound (B) contains more than 600 parts by weight of the softener for 100 parts by weight of the rubber component, the softener may bleed from the surface of the dynamically crosslinked substance or the softener may inhibit crosslinking. Thus the rubber component is not crosslinked sufficiently, and the property of the dynamically crosslinked substance is liable to deteriorate.

Supposing that the rubber is oil-unextended type, 100 parts by weight of the rubber component means 100 parts by weight of the oil-unextended type. Supposing that the rubber is oil-extended type, 100 parts by weight of the rubber component means the weight of only the rubber component obtained by subtracting the weight of the oil component from that of the oil-extended rubber. If the rubber is a mixture of the oil-extended rubber and the oil-unextended rubber, 100 parts by weight of the rubber component means the weight of the total of the weight of the rubber component obtained by subtracting the weight of the oil component from that of the oil-extended rubber and the weight of the oil-unextended rubber.

As the softener, oil and plasticizer can be used. As the oil, it is possible to use known synthetic oil such as paraffin oil, naphthenic oil, mineral oil of aromatic series, oligomer of hydrocarbon series, and process oil. As the synthetic oil, it is possible to use oligomer of α-olefin, oligomer of butane, and amorphous oligomer of ethylene and α-olefin. As the plasticizer, it is possible to use dioctyl phthalate (DOP), dibutyl phthalate (DBP), dioctyl sebacate (DOS), and dioctyl adipate (DOA).

In the compound (B) containing the rubber component whose main component is the EPDM, it is most favorable that the rubber component consists of the EPDM only. In blending the EPDM and other rubbers, the ratio of the EPDM to all the rubbers is favorably not less than 50 wt % and more favorably not less than 80 wt %. The paper-feeding roller to be used for office appliances is required to be ozone-resistant and heat-resistant. Thus to allow the paper-feeding roller to be ozone-resistant and heat-resistant, it is preferable to set the ratio of the EPDM to the above-described range. The reason is as follows: The EPDM consists of saturated hydrocarbon and does not contain double bond in the main chain. Thus even though the EPDM is exposed to a high-concentration ozone atmosphere or environment which is radiated with light beams for a long time, the main chain of the EPDM is hardly cut and hence ozone-resistant and heat-resistant.

In addition to the EPDM, diene rubbers can be preferably contained in the rubber compound (B) as rubber components or rubbers which can be crosslinked. As the diene rubbers, it is possible to use chloroprene rubber (CR), natural rubber (NR), butadiene rubber (BR), styrene butadiene rubber (SBR), isoprene rubber (IR), and acrylonitrile-butadiene rubber (NBR). These rubbers are used singly or in combination. In the case where the diene rubber is used in combination with thermoplastic resin, it is possible to use a crosslinking agent which crosslinks the diene rubber but does not crosslink the thermoplastic resin. In addition, it is possible to use butyl rubber, ethylene propylene rubber, acrylic rubber, and chlorosulfonated polyethylene rubber.

In the case where the above-described rubbers are used as the oil-extended rubber, it is preferable that the above-described rubbers have a possible largest molecular weight to prevent bleeding of the oil, reduce the compression set of the composition, and improve the wear resistance of the roller. In the case of using EPDM as the rubber, it is possible to use Esprene 670F produced by Sumitomo Chemical Co., Ltd., Esprene 601F produced by Sumitomo Chemical Co., Ltd., and KELTAN 509×100 produced by DMS Copolymer, Inc.

As the olefin resin, olefin resins commercially available can be used: polyethylene, polypropylene, ethylene ethyl acrylate resin, ethylene vinyl acetate resin, ethylene methacrylate resin, ionomer resin, polyester resin, and chlorinated polyethylene. These resins can be used singly or in combination of two or more thereof. Other thermoplastic resins may be used.

As the styrene thermoplastic elastomer, it is preferable to use a mixture of a high-molecular-weight styrene thermoplastic elastomer having a number-average molecular weight not less than 80,000, favorably not less than 150,000, and more favorably not less than 250,000 and a low-molecular-weight styrene thermoplastic elastomer having a number-average molecular weight not more than 70,000 and favorably not more than 60,000. Thereby it is possible to improve the mechanical property of the composition containing the high-molecular-weight resin, improve the durability of the roller during supply of paper thereto, suppression of generation of worn powder, allow very favorable dispersibility of the rubber, considerably improve processability, and thereby considerably increase the amount of the rubber. The increase of the rubber leads to drastic reduction of worn powder and improvement of durability of the roller. In addition to the (poly)styrene thermoplastic elastomer, it is possible to use other thermoplastic elastomers such as the polyolefin thermoplastic elastomer, the polyester thermoplastic elastomer, the polyamide thermoplastic elastomer, and polyurethane thermoplastic elastomer.

The number-average molecular weight of the high-molecular-weight styrene thermoplastic elastomer is set to nor more than 80,000 to allow the thermoplastic elastomer composition to have preferable mechanical property (wear resistance and durability). The number-average molecular weight of the low-molecular-weight thermoplastic elastomer is set to not more than 70,000 to improve the moldability and processability of the thermoplastic elastomer composition and improve the dispersibility of the rubber. In the case where both the high-molecular-weight styrene thermoplastic elastomer and the low-molecular-weight styrene thermoplastic elastomer are used, those skilled in the art can select a preferable combination. For example, it is preferable to select a combination of a styrene-ethylene-ethylene/propylene-styrene copolymer (SEEPS) having a molecular weight of not less than 80,000 and a styrene-ethylene-ethylene/propylene-styrene copolymer (SEEPS) or a styrene-ethylene/propylene-styrene copolymer (SEPS) having a molecular weight of not more than 70,000. In addition, it is possible to appropriately select a combination from among a styrene-ethylene-styrene copolymer (SES), SEPS, SEEPS, and a styrene-ethylene/butylene-styrene copolymer (SEBS).

As the styrene thermoplastic elastomers having different number-average molecular weights, a hydrogenated styrene thermoplastic elastomer is preferable. The double bond of the hydrogenated styrene thermoplastic elastomer is saturated with hydrogenation and has a low hardness and a high friction coefficient. Thus the hydrogenated styrene thermoplastic elastomer does not have a reaction with a crosslinking agent and thus is not crosslinked therewith in the dynamic crosslinking of the rubber. Therefore, the hydrogenated styrene thermoplastic elastomer does not inhibit the crosslinking of the rubber, and the dynamically crosslinked thermoplastic elastomer composition displays its required plasticity. Accordingly, it is preferable to use the styrene thermoplastic elastomer which is hydrogenated in such an extent that it is not crosslinked in the dynamic crosslinking of the rubber. By addition of a non-hydrogenated elastomer (SBS, SIS, and the like) within limits not damaging processability, it is possible to increase the mechanical strength of the roller by crosslinking between the resin and the rubber. As the hydrogenated styrene thermoplastic elastomer, it is possible to use the styrene-ethylene-styrene copolymer (SES), the styrene-ethylene-ethylene/propylene-styrene copolymer (SEPS), the styrene-ethylene-ethylene/propylene-styrene copolymer (SEEPS), and the styrene-ethylene/butylene-styrene copolymer (SEBS).

The weight ratio between the high-molecular-weight styrene thermoplastic elastomer and the low-molecular-weight styrene thermoplastic elastomer is 95:5–1:99 and favorably 90:10–5:95, and more favorably 75:25–15:85.

If the weight ratio is out of range of 95:5–1:99, there is a possibility that the rubber roller has deteriorated mechanical strength and that worn powder is generated. An optimum weight ratio therebetween can be selected appropriately according to the purpose of use and the relationship between the styrene thermoplastic elastomer and other components.

A resinous crosslinking agent can be used preferably to perform the dynamic crosslinking. The resinous crosslinking agent is a synthetic resin used to allow the rubber to make a crosslinking reaction by heating or the like. Unlike the case in which sulfur and a vulcanizing accelerator are used, the use of the resinous crosslinking agent makes it difficult for blooming to occur and makes the compression set of the thermoplastic elastomer composition low. Therefore the resinous crosslinking agent is preferable because it is superior in keeping accuracy and durability of the roller. Phenol resin can be preferably used to enhance the paper-feeding performance of the roller.

As other resinous crosslinking agents, melamine-formaldehyde resin, triazine.formaldehyde condensate, hexametoxymethyl-melamine resin can be used. Phenol resin is most favorable. As the phenol resin, it is possible to use phenol resins synthesized by reaction of phenols such as phenol, alkylphenol, cresol, xylenol, and resorcin with aldehydes such as formaldehyde, acetic aldehyde, and furfural. It is preferable to use alkylphenol-formaldehyde resin resulting from reaction of formaldehyde and alkylphenol having alkyl group connected to the ortho position or the para position of benzene, because the alkylphenol-formaldehyde resin is compatible with rubber and reactive, thus making a crosslinking reaction start time comparatively early. Alkyl group of the alkylphenol-formaldehyde resin has 1–10 carbon atoms. Thus methyl group, ethyl group, propyl group and butyl group are exemplified. It is possible to use modified alkylphenol resin formed by addition condensation of para-tertiary butyl phenol sulfide and aldehydes; and alkylphenol sulfide resin as the resinous crosslinking agent. The resinous crosslinking agent is used at favorably not less than 1 part by weight nor more than 50 parts by weight and more favorably not less than 8 parts by weight nor more than 15 parts by weight for 100 parts by weight of the rubber component.

The dynamic crosslinking in the present invention may be accomplished in the presence of halogen (chloride, bromide, fluoride, and iodine). To allow the halogen to be present in the dynamic crosslinking reaction, a halogenated resinous crosslinking agent is used or a halogen donor is added to the elastomer composition. As the halogenated resinous crosslinking agent, halogenated resins of addition condensation type can be used. Above all, halogenated phenol resin having at least one halogen atom connected to the aldehyde unit of the phenol resin is favorable. Halogenated alkylphenol formaldehyde resin is most favorable because it is compatible with rubber and reactive and makes a crosslinking reaction start time comparatively early.

As the halogen donor, tin chloride such as stannic chloride, ferric oxide, and cupric chloride can be used.

Chlorinated polyethylene can be used as the halogenated resin. The halogen donors can be used singly or in combination of two or more thereof.

A crosslinking activator may be used to accomplish the cross-linking reaction properly. Metal oxide is used as the crosslinking activator. As the metal oxide, zinc oxide and zinc carbonate are preferable.

In addition to the resinous crosslinking agent, it is preferable to use peroxides in performing the dynamic crosslinking reaction because the use of the peroxides makes it difficult for blooming to occur and decreases the extent of the compression set. The dynamic crosslinking reaction may be performed by using sulfur.

In the case where the peroxide is used to perform the dynamic crosslinking reaction, the following peroxides can be selectively used as necessary: 2,5-dimethyl-2,5-di(t-butyl peroxy)hexyne-3; 2,5-dimethyl-2,5-di(t-butyl peroxy) hexane; and dicumyl peroxide. In performing the crosslinking reaction by using the peroxide, to improve and adjust the mechanical properties of the roller such as fatigue characteristic and improve crosslinking density, the following crosslinking co-agents may be used: triallyl isocyanurate (TAIC), triallyl cyanurate (TAC), trimethylolpropane methacrylate (TMPT), and ethylene glycol dimethacrylate (EDMA). As necessary, resin and sulfur be used in performing the crosslinking reaction by using the peroxide.

A filler may be contained in the thermoplastic elastomer composition as necessary to improve its mechanical strength of the roller. As the filler, it is possible to use powder such as silica, carbon black, clay, talc, and the like. It is preferable that the thermoplastic elastomer composition contains not more than 60 parts by weight of the filler for 100 parts by weight of rubber. If the filler is used at more than 60 parts by weight, the flexibility of rubber may deteriorate.

The thermoplastic elastomer composition may contain an age resistor, wax, and the like. As the age resistor, it is possible to use imidazoles such as 2-mercaptobenzimidazole; amines such as phenyl-α-naphthylamine, N,N'-di-6-naphthyl-p-phenylenediamine, and N-phenyl-N'-isopropyl-p-phenylenediamine; and phenols such as di-t-butyl-p-cresol, and styrenated phenol.

The hardness of the rubber roller of the present invention is 15–50 and favorably 20–45 when its hardness is measured by an A-type hardness tester of JIS6301. The paper-feeding roller having the hardness in this range deforms sufficiently when it is pressed against paper or a film at a comparatively small force. Consequently the paper-feeding roller contacts the paper or the film in a large area.

The paper-feeding roller cylindrically formed has a thickness of 0.5 mm–20 mm and preferably 1 mm–15 mm. If the paper-feeding roller has a very small thickness, it is difficult to form a large area of contact between the rubber roller and paper when the rubber roller deforms, although the strength of the paper-feeding roller should be considered. On the other hand, if the paper-feeding roller has a very large thickness, it is necessary to press the paper-feeding roller against the paper at a great force to deform the rubber roller. In this case, it is necessary to enlarge the mechanism for pressing the rubber roller against the paper.

The present invention provides a method of manufacturing the paper-feeding roller, which comprising the steps of dispersing a rubber or a thermoplastic elastomer which can be crosslinked in a thermoplastic resin or a thermoplastic elastomer by dynamic crosslinking by using an extruder or a kneader; kneading a composition obtained by performing the dynamic crosslinking again by the extruder or the kneader; adding titanium oxide to the composition to obtain a thermoplastic elastomer composition; and molding the thermoplastic elastomer composition cylindrically.

As described above, after the rubber or the thermoplastic elastomer which can be crosslinked is dispersed by dynamic crosslinking in the thermoplastic resin or the thermoplastic elastomer by using an extruder or a kneader, titanium oxide is added to the composition. Thereby the titanium oxide is allowed to be located in the surface layer of the paper-feeding roller. Therefore it is possible to efficiently improve the volume fraction of the titanium oxide present in the surface layer of the paper-feeding roller and dispose the titanium oxide in the neighborhood of the surface of the paper-feeding roller which feeds paper in contact therewith. Accordingly it is possible to prevent an unnecessary use of the titanium oxide and save the cost of the material for the paper-feeding roller.

Normally, much resin is present in the surface layer of the paper-feeding roller formed by the extruder or the injection molding machine. The titanium oxide has a characteristic that it hardly enters a dynamically crosslinked rubber phase and is selectively mixed with the resin or uncrosslinked thermoplastic elastomer. Thus in the manufacturing method of the present invention, the titanium oxide is selectively disposed in the resin of the thermoplastic elastomer, namely, in the surface of the paper-feeding roller.

It is preferable that the heating temperature in the dynamic crosslinking reaction is 160° C.–200° C. and that the heating time period is 1–20 minutes. It is preferable that the heating temperature when the titanium oxide is added to the thermoplastic elastomer composition is 160° C.–220° C. and that the heating time period is 1–20 minutes. It is preferable to swell the thermoplastic resin or the thermoplastic elastomer in a softener in forming the compound (A) containing the styrene thermoplastic elastomer at its main component. Preferably, the composition obtained by the dynamic crosslinking is pellet like. Thereby it is possible to obtain a preferable moldability.

As the extruder, a biaxial extruder can be used. As the kneader, an open roll, a Banbury mixer, and inclosed-type kneader can be used. The paper-feeding roller of the present invention can be produced by a conventional method instead of the manufacturing method of the present invention. It is possible to accomplish the dynamic crosslinking reaction with the titanium oxide contained in the thermoplastic elastomer composition.

DETAILED DESCRIPTION OF THE PREFERRED EMBODIMENTS

The embodiments of the present invention will be described below with reference to drawings.

Figure 1:
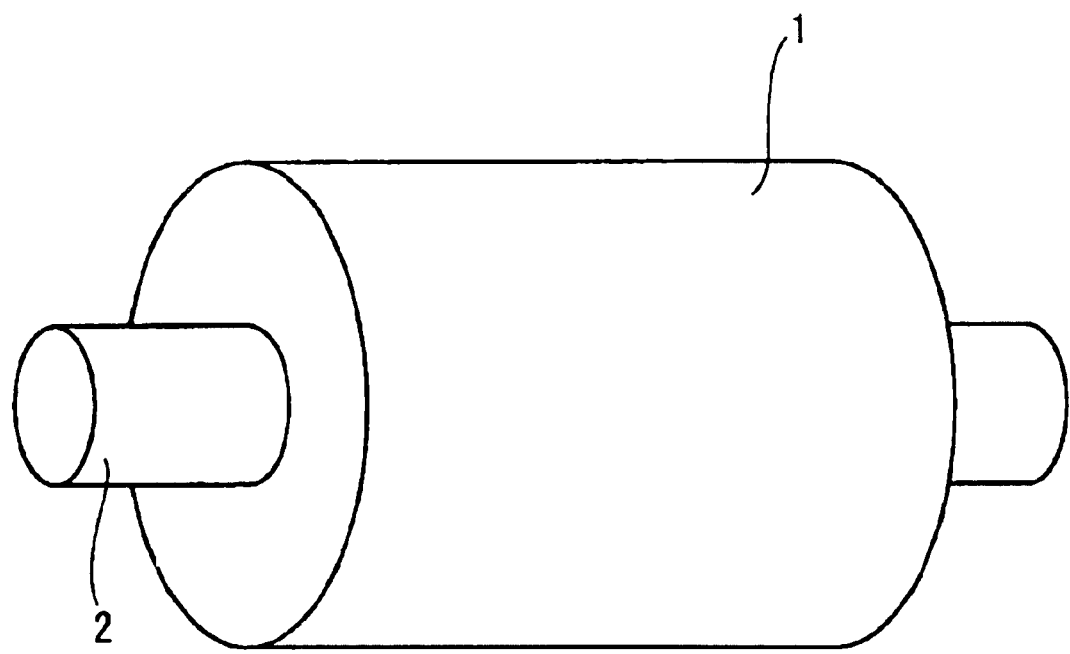
FIG. 1 is a schematic view showing a paper-feeding roller of the present invention.
Figure 2:
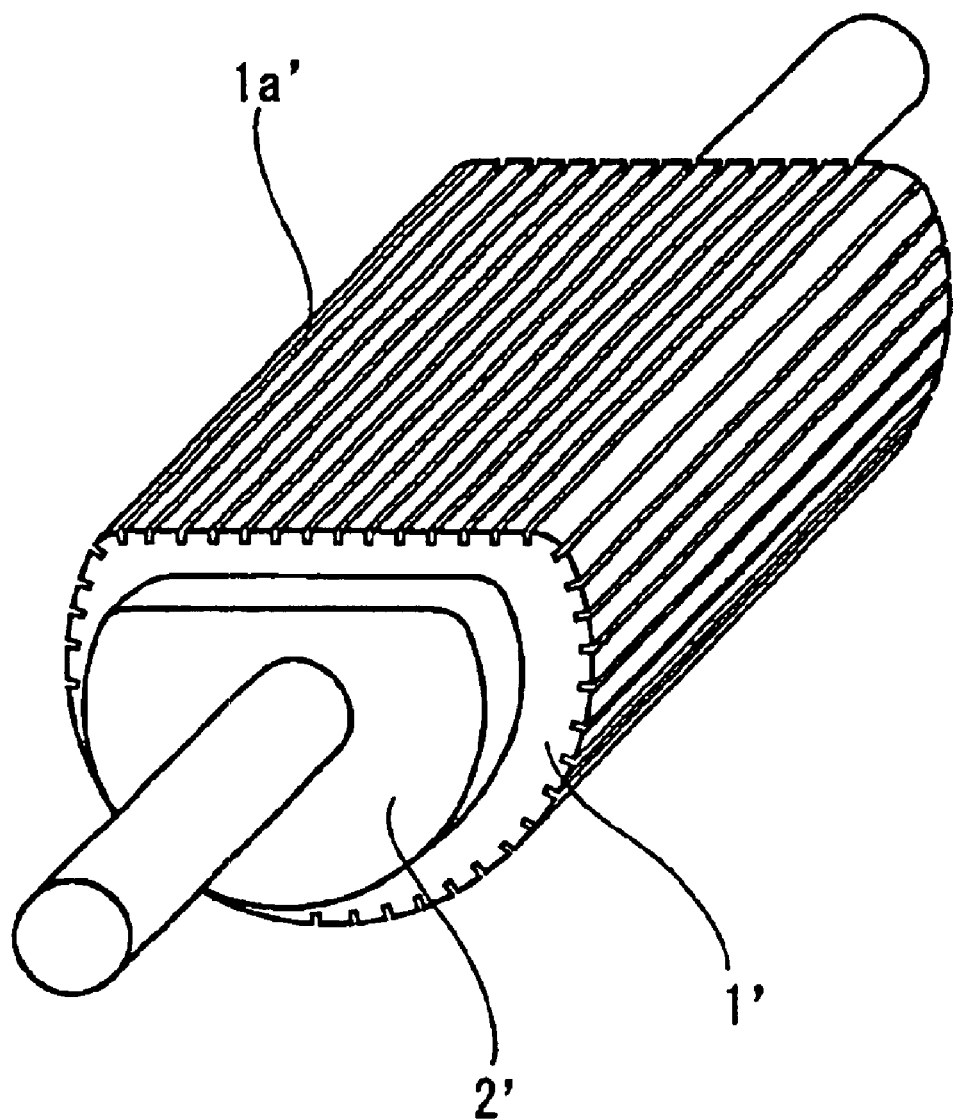
FIG. 2 is a schematic view showing a D-shaped paper-feeding roller of the present invention.

As shown in FIG. 1, a paper-feeding roller 1 of the embodiment is formed by cylindrically molding a thermoplastic elastomer composition containing components which will be described later to obtain a roller and then pressing a shaft 2 into a hollow portion of the roller or bonding the shaft 2 to the hollow portion thereof with an adhesive agent. As another method, as shown in FIG. 2, a paper-feeding roller 1' can be formed by pressing a D-shaped core material 2' into a hollow portion of a roller cylindrically formed. Knurled grooves 1a' are formed on the surface of the paper-feeding roller 1'. The surface layer of each of the paper-feeding rollers 1 and 1' contains titanium oxide at 6.6% in a volume fraction.

The thermoplastic elastomer composition is formed by dispersing a compound (B) containing a rubber component whose main component is EPDM by dynamic crosslinking in a compound (A) containing a styrene thermoplastic elastomer as a main component thereof.

The rubber component of the compound (B) is oil-extended EPDM containing oil in an amount equal to that of rubber. The compound (A) contains polypropylene that is an olefin resin and a required amount of oil. Used as the thermoplastic elastomer is a mixture of a hydrogenated styrene thermoplastic elastomer (SEEPS) whose number-average molecular weight is 300,000 and a hydrogenated styrene thermoplastic elastomer (SEEPS) whose number-average molecular weight is 54,000.

Zinc oxide is used as a crosslinking activator. A phenolic resinous crosslinking agent is used as a resinous crosslinking agent. Paraffin oil is used as a softener to be added to the composition to improve its processability and adjust its hardness.

By using an extruder or a kneader, the compound (A), the compound (B), and additives are kneaded, and the rubber is dispersed in the compound (A) by dynamic crosslinking. Thereafter a required amount of titanium oxide is mixed with a mixture of the compound (A) and the compound (B). Then they are kneaded again by the extruder or the kneader to obtain the thermoplastic elastomer composition. Then the thermoplastic elastomer composition is cylindrically molded by the extruder.

Since the paper-feeding roller 1 is formed by molding the thermoplastic elastomer composition and contains a required amount of the titanium oxide in a volume fraction in its surface layer, the paper-feeding roller 1 has a rubber-like durability, elasticity, flexibility, resin-like moldability, and a high wear resistance. Therefore the roller reduces the degree of non-feeding of silica paper that is a problem to be solved and has a preferable feeding force.

Examples of the present invention and comparison examples will be described below in detail.

As shown in tables 1 through 3, compositions having the formulations shown in tables 1 through 3 were molded cylindrically to obtain roller-shaped products. A shaft was fitted into each roller-shaped product to prepare a paper-feeding roller of each of the examples and the comparison examples. Knurled grooves were formed on the surface of each paper-feeding roller.

TABLE 1

| Components | E1 | E2 | E3 |
|---|---|---|---|
| Rubber 1 | 55 | 55 | 55 |
| High-molecular-weight hydrogenated styrene TPE1 | 8.75 | 8.75 | 8.75 |
| Low-molecular-weight hydrogenated styrene TPE2 | 26.25 | 26.25 | 26.25 |
| Olefin resin | 10 | 10 | 10 |
| Softener 1 | 110 | 110 | 110 |
| Titanium oxide | 33.00 | 16.50 | 8.25 |
| Crosslinking agent 1 | 6.6 | 6.6 | 6.6 |
| Crosslinking activator 1 | 2.75 | 2.75 | 2.75 |
| Volume fraction (vol. %) of titanium oxide on surface of roller | 6.6 | 3.4 | 1.7 |
| Feeding force [gf] (for silica paper) Immediately after supply of paper | 325 | 327 | 328 |
| 100 sheets of paper | 301 | 293 | 288 |
| 200 sheets of paper | 279 | 272 | 269 |
| 500 sheets of paper | 219 | 211 | 207 |
| 1000 sheets of paper | 191 | 173 | 164 |
| 2000 sheets of paper | 185 | 161 | 150 |
| Feeding force [gf] (for plain paper) Immediately after supply of paper | 291 | 306 | 298 |
| 100 sheets of paper | 286 | 295 | 290 |
| 200 sheets of paper | 280 | 289 | 285 |
| 500 sheets of paper | 274 | 281 | 277 |
| 1000 sheets of paper | 267 | 270 | 269 |
| 2000 sheets of paper | 263 | 264 | 262 | where "E" denotes example.

TABLE 2

| Components | CE1 |
|---|---|
| Rubber 1 | 55 |
| High-molecular-weight hydrogenated styrene TPE1 | 8.75 |
| Low-molecular-weight hydrogenated styrene TPE2 | 26.25 |
| Olefin resin | 10 |
| Softener 1 | 110 |
| Titanium oxide | 0 |
| Crosslinking agent 1 | 6.6 |
| Crosslinking activator 1 | 2.75 |
| Volume fraction (vol. %) of titanium oxide on surface of roller | 0.0 |
| Feeding force [gf] (for silica paper) Immediately after supply of paper | 329 |
| 100 sheets of paper | 284 |
| 200 sheets of paper | 265 |
| 500 sheets of paper | 203 |
| 1000 sheets of paper | 155 |
| 2000 sheets of paper | 116 |
| Feeding force [gf] (for plain paper) Immediately after supply of paper | 320 |
| 100 sheets of paper | 303 |
| 200 sheets of paper | 298 |
| 500 sheets of paper | 287 |
| 1000 sheets of paper | 273 |
| 2000 sheets of paper | 265 | where "CE" denotes comparison example.

TABLE 3

| Components | CE2 |
|---|---|
| Rubber 2 | 100 |
| Calcium carbonate treated with aliphatic acid | 50 |
| Softener 2 | 100 |
| Titanium oxide | 10 |
| Crosslinking activator 2 | 10 |
| Zinc acrylate | 5 |
| Dipentamethylenetetrasulfide | 0.5 |
| Crosslinking agent 2 | 3 |
| accelerator | 1.5 |

TABLE 3-continued

| | Components | CE2 |
|---|---|---|
| | Volume fraction (vol. %) of titanium oxide on surface of roller | 1.1 |
| Feeding force [gf] (for silica paper) | Immediately after supply of paper | 263 |
| | 100 sheets of paper | 233 |
| | 200 sheets of paper | 212 |
| | 500 sheets of paper | 157 |
| | 1000 sheets of paper | 120 |
| | 2000 sheets of paper | 114 |
| Feeding force [gf] (for plain paper) | Immediately after supply of paper | 321 |
| | 100 sheets of paper | 235 |
| | 200 sheets of paper | 204 |
| | 500 sheets of paper | 187 |
| | 1000 sheets of paper | 184 |
| | 2000 sheets of paper | 185 | where "CE" denotes comparison example.

The numerical values shown in columns of the tables above the column of the item of "volume fraction (vol. %) of titanium oxide on surface of roller" indicate parts by weight. The abbreviation TPE indicates thermoplastic elastomer.

Materials used are described below. Regarding the rubber 1, the content of the oil of 100% oil-extended EPDM is included in the column of "softener 1", and the value of only the rubber component is shown in the column of "rubber 1".

Rubber 1: EPDM in the trade name of Esprene 670F (paraffin oil, 100% oil-extended) produced by Sumitomo Chemical Co., Ltd.

Rubber 2: Chlorinated polyethylene (Daisolac N130, which is a rubber grade whose molecular weight is not less than 200000, produced by Daiso Co., Ltd.)

High-molecular-weight hydrogenated styrene TPE1: SEEPS (Mn(number-average molecular weight) 300,000, Mw(weight-average molecular weight)=342,000), produced by Kuraray Co., Ltd., Septon 4077)

Low-molecular-weight hydrogenated styrene TPE2: SEEPS in which one termination is modified into hydroxyl group (Mn=54,000, Mw=60,000) in the name of Septon HG252 produced by Kuraray Co., Ltd.

Olefin resin: polypropylene in the trade name of Novatech PP BC6 produced by Japan Polychem Corporation.

Softener 1: Paraffin oil Diana process oil PW-380 produced by Idemitsu Kosan Co., Ltd.

Softener 2: Dioctylphthalate

Titanium oxide: Kronos titanium oxide KR380 produced by Titan Kogyo Kabushiki Kaisha.

Calcium carbonate treated with aliphatic acid: Hakuenka CC produced by Shiraishi Calcium Kabushiki Kaisha.

Crosslinking activator 1: Zinc white produced by Mitsui Kinzoku Kogyo Kabushiki Kaisha.

Crosslinking activator 2: Magnesium oxide under the trade name of Magsalat 150ST manufactured by Kyowa Chemical Industry Co., Ltd.

Crosslinking agent 1: Tackrol 250-III produced by Taoka Chemical Co., Ltd.

Crosslinking agent 2: 2,4,6-trimercapto-1,3,5-triazine in the trade name of OF-100 produced by Daiso Co., Ltd.

Accelerator: salt of 2-mercaptobenzothiazole dicylohexy-lamine in the trade name of M-181 produced by Daiso Co., Ltd.

The paper-feeding roller of each of the examples 1 through 3 was prepared as follows:

After the thermoplastic elastomer composition was swollen in the softener, they were kneaded by a biaxial extruder, a kneader or a Banbury mixer together with pellets of the olefin resin for 1–20 minutes at 160° C.–220° C. to prepare pellets consisting of a mixture (compound) of the thermoplastic elastomer composition, the olefin resin, and the softener. Then, the pellets, the rubber, and a reactive phenolic resin serving as the resinous crosslinking agent, and additives such as zinc white, an age resister, and a filler were supplied to the biaxial extruder to knead them while they were being heated at 160° C.–220° C. for 1–20 minutes. After the rubber was dynamically crosslinked, the rubber composition was extruded.

Then, the extruded kneaded rubber composition was cooled to pellet it. The titanium oxide was mixed with the pellets of the dynamically crosslinked rubber composition. Then the mixture was supplied to the biaxial extruder again to knead the mixture for 1–20 minutes while it was being heated at 160° C.–220° C. The mixture may be kneaded by the kneader or the Banbury mixer instead of the biaxial extruder. Thereafter the mixture of the dynamically crosslinked rubber composition and the titanium oxide was formed into pellets by a known method. The pellets were molded tubularly by an extruding molding machine. Thereafter the semi-finished product was cut to a required size to obtain a roller of each of the examples 1 through 3 having the same shape as that of the paper-feeding roller to be mounted on an ink jet printer BJ S630 manufactured by Canon.

The paper-feeding roller of the comparison example 1 was formed by a method similar to that of the examples 1 through 3 in the process before the titanium oxide was mixed with the pellets. The pellets were tubularly formed by the extruding molding machine. The tubular mixture was cut to a required size to obtain a roller.

The paper-feeding roller of the comparison example 2 was formed as follows: Materials shown in table 3 were supplied to an enclosed-type kneader to knead them. An obtained rubber composition was supplied to a mold and heated at 160° C.–170° C. for 10–60 minutes to mold it tubularly. Thereafter the semi-finished product was cut to a required size to obtain a roller of the comparison example 2 having the same shape as that of the paper-feeding roller to be mounted on the ink jet printer BJ S630 manufactured by Canon.

EXAMPLES 1–3

The paper-feeding roller of each of the examples 1 through 3 was composed of the thermoplastic elastomer composition formed by dispersing the compound (B) containing the EPDM as its main component and a necessary amount of the softener by dynamic crosslinking in the compound (A) containing a mixture of the high-molecular-weight styrene thermoplastic elastomer having the number-average molecular weight not less than 80,000 and the low-molecular-weight styrene thermoplastic elastomer having the number-average molecular weight nor more than 70,000, the olefin resin, and a necessary amount of the softener. Each of the thermoplastic elastomer compositions contained the titanium oxide at not less than 1.5% in a volume fraction.

COMPARISON EXAMPLES 1 AND 2

The paper-feeding roller of each of the comparison examples 1 and 2 are out of the scope of the present invention. The paper-feeding roller of the comparison example 1 was composed of the same thermoplastic elastomer composition as that of the examples 1 through 3 but did not contain the titanium oxide. The paper-feeding roller of the comparison example 2 contained the titanium oxide. However, the paper-feeding roller was composed not of the thermoplastic elastomer composition, but of vulcanized rubber containing chlorinated polyethylene rubber as its main component.

Paper Supply Test (Measurement of Feeding Force)

Figure 3:
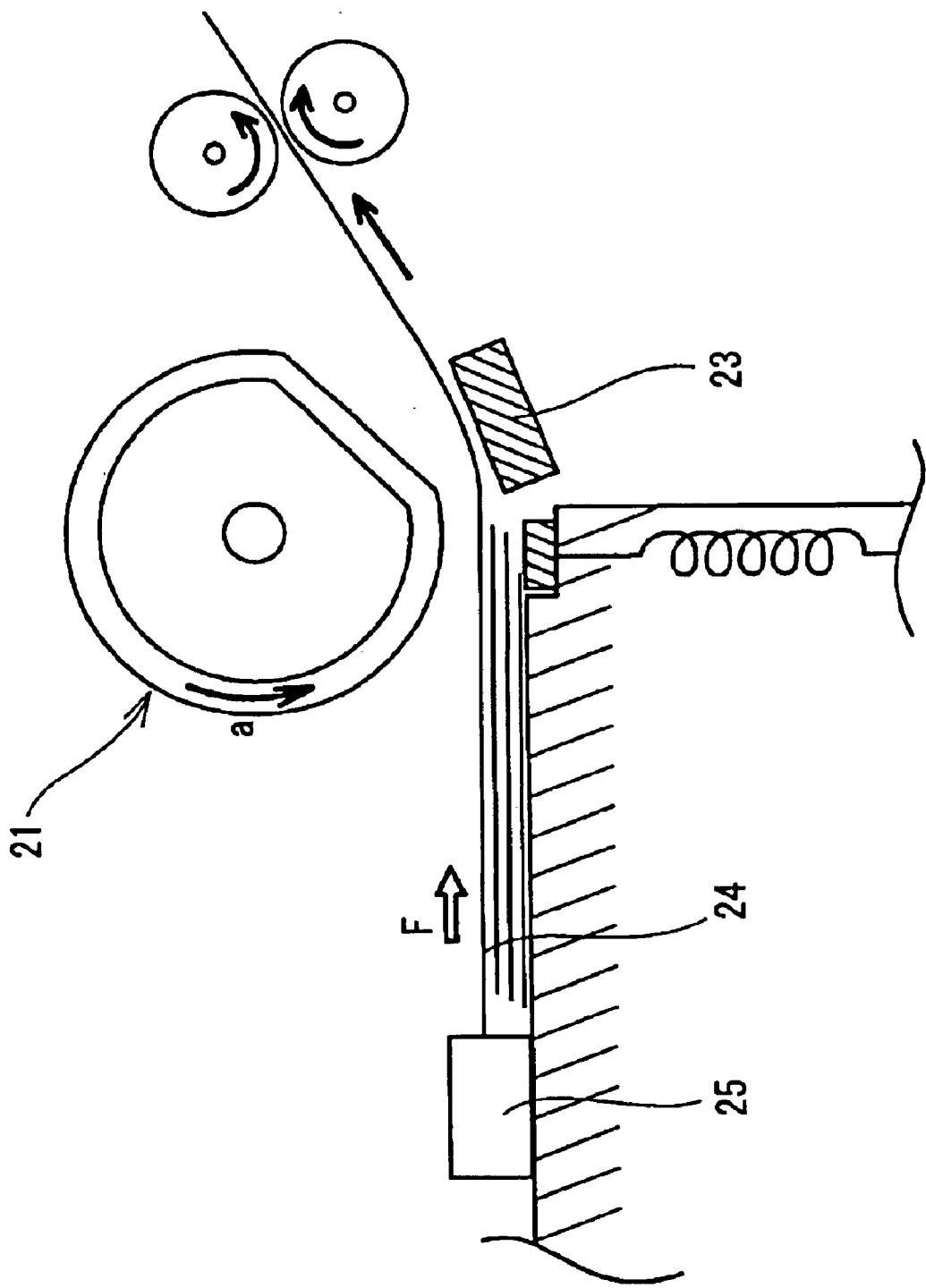
FIG. 3 shows a method of measuring a feeding force.

The feeding force of each paper-feeding roller was measured by carrying out the method shown in FIG. 3. The machine used for the measurement was the ink jet printer BJ S630 manufactured by Canon. With a plurality of paper 24 (silica paper: LC301, plain paper: Canon PB paper) of size A4 placed on an ASF unit of the paper supply mechanism including a paper-feeding roller 21 and a plate 23, the uppermost paper was connected to a digital force gauge 25.

The paper supply mechanism was operated at a temperature of 23° C. and a humidity of 55% to rotate the paper-feeding roller 21 in the direction shown with the arrow a of the solid line of FIG. 3. A feeding force F (gf) of the paper 24 generated in the direction shown with the white arrow was measured with the digital force gauge 25 during supply of the paper to the paper-feeding roller 21.

In measuring the feeding force, a paper supply roller composed of the paper-feeding roller of each of the examples and the comparison examples was mounted on the ink jet printer BJ S630 manufactured by Canon. Silica paper or plain paper was used. The paper supply roller was rotated to start paper feeding to measure the feeding force when each of the following number of sheets of the plain paper and the silica paper (100, 200, 500, 1000, and 2000 sheets) was supplied to each roller. The total number of each of the plain paper and the silica paper supplied to each roller was 2,000. By using the above-described method, the feeding force of each roller for each of the plain paper and the silica paper was measured immediately after the paper supply test started and when each of 100, 200, 500, 1000, and 2000 sheets thereof was supplied to each roller.

The larger the numerical value of the feeding force measured by the method is, the more favorable the feeding force of the roller is. In the case of the test machine (ink jet printer BJ S630), the feeding force not less than 140 gf–150 gf is necessary.

As shown in tables 1 through 3, when 2000 sheets of the plain paper and the silica paper were supplied to the roller of each of the examples 1 through 3, each roller had a feeding force not less than 140 gf, which was suitable for being put into practical use. The roller of example 1 higher than that of the examples 2 and 3 in "volume fraction (vol. %) of titanium oxide on surface of roller" shown in tables 1 and 2 was largest in the feeding force, when 2000 sheets of the silica paper was supplied thereto.

The roller of the comparison example 1 different from that of the example 1 in that the former did not contain the titanium oxide was on almost the same level as that of the latter in the feeding force for the plain paper. However, the feeding force thereof for the silica paper was less than 140 gf, when 2000 sheets were supplied thereto. Thus the roller of the comparison example 1 was unsuitable for practical use. The feeding force of the roller of the comparison example 2 containing the chlorinated polyethylene rubber as its main component was 185 gf for the plain paper, when 2000 sheets thereof were supplied thereto. Thus the roller of the comparison example 2 can be practically used for the plain paper. However, the feeding force of the roller of the comparison example 2 was much lower than that of the rollers of the examples having values 262–264 gf for the supply of 2000 sheets thereto. The feeding force of the roller of the comparison example 2 for the silica paper was less than 140 gf, when 1000 sheets thereof were supplied thereto. Thus the roller of the comparison example 2 cannot be practically used for the silica paper.

As apparent from the foregoing description, according to the present invention, the thermoplastic elastomer composition of the paper-feeding roller contains the thermoplastic resin or the thermoplastic elastomer in which the rubber or the thermoplastic elastomer which can be crosslinked is dispersed by dynamic crosslinking. Therefore the paper-feeding roller has a rubber-like durability, elasticity, flexibility, resin-like moldability, and a high wear resistance. The paper-feeding roller contains the titanium oxide at not less than 1.5% nor more than 50% in a volume fraction in its surface layer which contacts objects such as paper. Therefore the paper-feeding roller reduces the degree of non-feeding of silica paper which is a problem to be solved and has a preferable feeding force before and after paper is supplied thereto.

Accordingly, the paper-feeding roller of the present invention can be very usefully applied to an ink jet printer or the like required to feed objects such as a sheet of paper or a film by picking up the objects one by one separately from the objects piled up one upon another. Thus the paper-feeding roller reduces the degree of non-feeding of silica paper which is a problem to be solved. Since the paper-feeding roller is thermoplastic, it can be recycled and thus manufactured at a low cost.

According to the method of manufacturing the paper-feeding roller of the present invention, after the thermoplastic elastomer composition is dynamically crosslinked, the titanium oxide is added to the composition. Thereby the titanium oxide is allowed to be located in the surface layer of the paper-feeding roller. Therefore it is possible to efficiently improve the volume fraction of the titanium oxide present in the surface layer of the paper-feeding roller and dispose the titanium oxide in the neighborhood of the surface of the paper-feeding roller which feeds paper in contact therewith. Accordingly it is possible to prevent an unnecessary use of the titanium oxide and save the cost of the material for the paper-feeding roller.

What is claimed is:

1. A paper-feeding roller formed by cylindrically molding a thermoplastic elastomer composition containing a thermoplastic resin or a thermoplastic elastomer in which a rubber or a thermoplastic elastomer which can be crosslinked is dispersed by dynamic crosslinking, wherein at least a surface layer of said paper-feeding roller contains titanium oxide at not less than 1.5% nor more than 50% in a volume fraction.

2. The paper-feeding roller according to claim 1, wherein said thermoplastic elastomer composition is formed by dispersing a compound (B) containing a rubber component whose main component is EPDM by dynamic crosslinking in a compound (A) containing a styrene thermoplastic elastomer as a main component thereof.

3. The paper-feeding roller according to claim 2, wherein said compound (A) contains not less than 15 nor more than 500 parts by weight of a softener for 100 parts by weight of said rubber component and not less than 1 nor more than 50 parts by weight of a resin whose main component is an olefin resin for 100 parts by weight of said rubber component, and said compound (B) contains not less than 15 nor more than 600 parts by weight of said softener for 100 parts by weight of said rubber component.

4. The paper-feeding roller according to claim 2, wherein said styrene thermoplastic elastomer is a mixture of a styrene thermoplastic elastomer having a number-average molecular weight not less than 80,000 and a styrene thermoplastic elastomer having a number-average molecular weight less than 70,000.

5. The paper-feeding roller according to claim 3, wherein said styrene thermoplastic elastomer is a mixture of a styrene thermoplastic elastomer having a number-average molecular weight not less than 80,000 and a styrene thermoplastic elastomer having a number-average molecular weight less than 70,000.

6. The paper-feeding roller according to claim 1, wherein said dynamic crosslinking is performed by using a resinous crosslinking agent.

7. The paper-feeding roller according to claim 2, wherein said dynamic crosslinking is performed by using a resinous crosslinking agent.

8. The paper-feeding roller according to claim 3, wherein said dynamic crosslinking is performed by using a resinous crosslinking agent.

9. The paper-feeding roller according to claim 4, wherein said dynamic crosslinking is performed by using a resinous crosslinking agent.

10. The paper-feeding roller according to claim 4, wherein said styrene thermoplastic elastomers having different number-average molecular weights are hydrogenated styrene thermoplastic elastomers.

11. The paper-feeding roller according to claim 5, wherein said styrene thermoplastic elastomers having different number-average molecular weights are hydrogenated styrene thermoplastic elastomers.

* * * * *